(12) United States Patent
Yamashita (10) Patent No.: US 7,311,006 B2
(45) Date of Patent: Dec. 25, 2007

(54) PRESSURE SENSOR

(75) Inventor: Yasuhiro Yamashita, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/480,991

(22) Filed: Jul. 6, 2006

(65) Prior Publication Data

US 2007/0020113 A1     Jan. 25, 2007

(30) Foreign Application Priority Data

Jul. 6, 2005     (JP)     ............................. 2005-197413

(51) Int. Cl.
*G01L 13/02*     (2006.01)
(52) U.S. Cl. .......................................... 73/716; 73/736
(58) Field of Classification Search ................... 73/716, 73/736
See application file for complete search history.

(56) References Cited

U.S. PATENT DOCUMENTS

6,813,953 B2     11/2004     Baba et al.

*Primary Examiner*—Andre J. Allen
(74) *Attorney, Agent, or Firm*—Posz Law Group, PLC (57) ABSTRACT

A pressure sensor has a case having a first side and a second side, and a sensing portion mounted to the case. A first diaphragm is disposed on the first side of the case such that a first chamber is defined. A second diaphragm is disposed on the second side of the case such that a second chamber is defined. The first chamber and the second chamber are filled with a pressure medium such as an oil. The case forms an introduction passage for introducing the pressure medium into the first chamber and the second chamber. In a condition that the first chamber and the second chamber are filled with the pressure medium, the introduction passage is sealed by a sealing part so that the first chamber and the second chamber are separated from each other and from an outside of the case.

12 Claims, 7 Drawing Sheets

PRESSURE SENSOR

CROSS REFERENCE TO RELATED APPLICATION

This application is based on Japanese Patent Application No. 2005-197413 filed on Jul. 6, 2005, the disclosure of which is incorporated herein by reference.

FIELD OF THE INVENTION

The present invention relates to a pressure sensor, which has two chambers filled with a pressure medium and detects a pressure based on a differential pressure between the pressure mediums of two chambers.

BACKGROUND OF THE INVENTION

An oil-filled type differential pressure sensor is for example known as a pressure sensor. The pressure sensor has a case, a sensing portion, and diaphragms. One of the diaphragms is provided on a first side of the case to define a first pressure detection chamber. The remaining diaphragm is provided on a second side of the case to define a second pressure detection chamber. The first and second pressure detection chambers are filled with a pressure medium. The sensing portion is provided on the case. The sensing portion outputs a signal in response to an applied pressure. This kind of pressure sensor is for example disclosed in Japanese Patent Publication No. 2003-315193 (U.S. Pat. No. 6,813,953 B2).

In the above pressure sensor, the sensing portion receives a pressure through the pressure medium of the first pressure detection chamber and a pressure through the pressure medium of the second pressure detection chamber. The pressure sensor detects a pressure based on a differential pressure between the pressure mediums of two chambers.

The pressure sensor is for example used to a diesel particulate filter (DPF) of a diesel engine for detecting a pressure loss before and after a filter. Generally, the DPF is a system for restricting soot and smoke from releasing into the atmosphere by the filter. The filter is provided in an exhaust pipe to trap the soot. When a certain amount of soot is trapped, it is burned.

Figure 8:
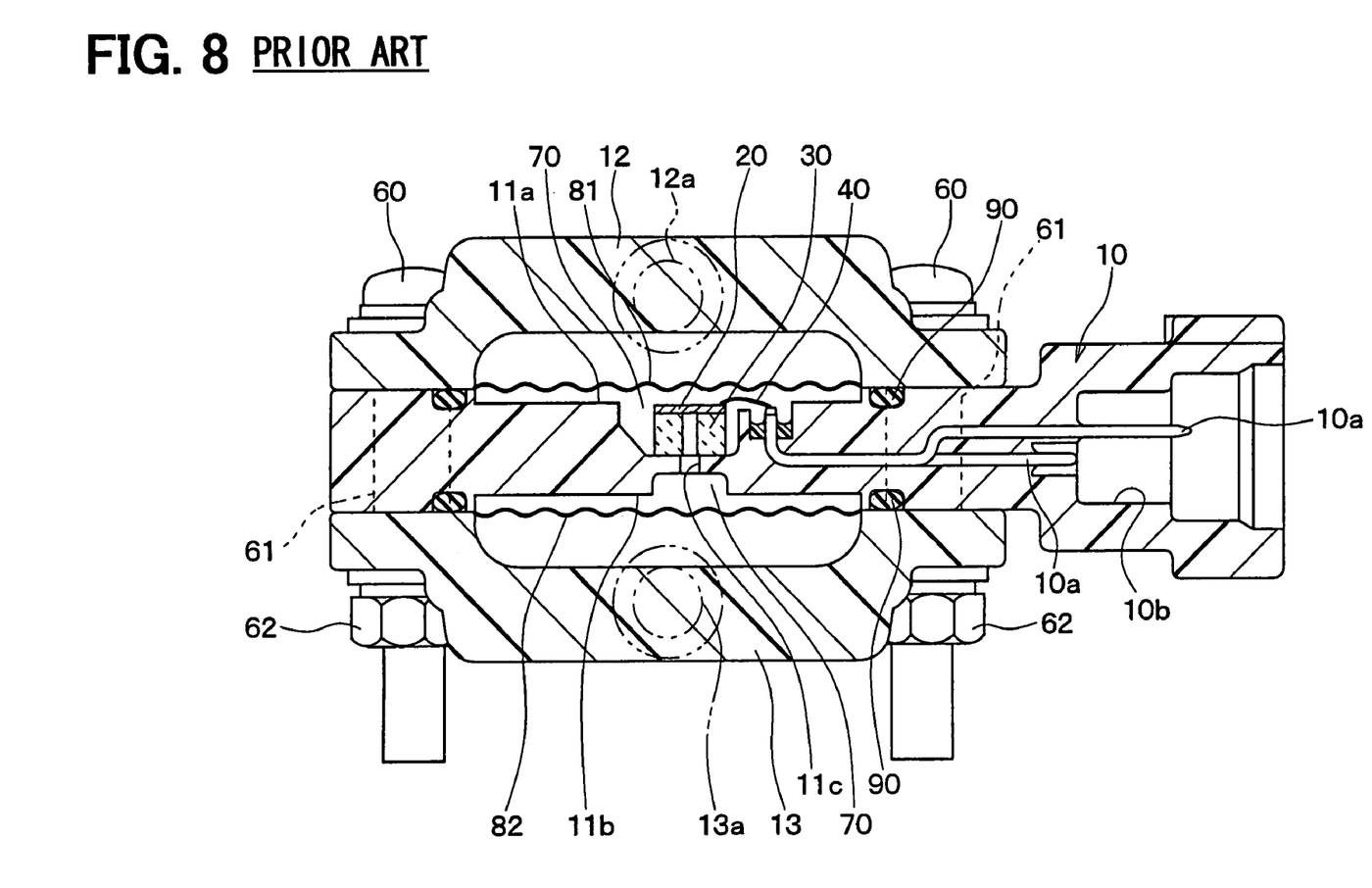
FIG. 8 is a cross-sectional view of a pressure sensor of a prior art.

As shown in FIG. 8, a case 10 of the pressure sensor forms a first recessed portion 11a on a first side and a second recessed portion 11b on a second side. A first diaphragm 81 is arranged to cover the first recessed portion 11a through an O-ring 90 so that a first pressure detection chamber is formed. Likewise, a second diaphragm 82 is arranged to cover the second recessed portion 11b through the O-ring 90 so that a second pressure detection chamber is formed.

The first and second diaphragms 81, 82 are for example made of metal. The first and second pressure detection chambers 81, 82 are filled with oil 70 as the pressure medium.

The case 10 is formed with a communication hole 11c between the first pressure detection chamber 11a and the second pressure detection chamber 11b. A sensing portion 20 is provided in the first pressure detection chamber 11a such that the communication hole 11c of the case 10 is covered. The sensing portion 20 outputs an electric signal in accordance with a degree of pressure applied thereto.

Also, a first pressure port member 12 and a second pressure port member 13 are connected to the case 10 with bolts 60 and nuts 61, 62 in a condition forced toward the O-rings 90 through the first and second diaphragms 81, 82, respectively. The ends of the diaphragms 81, 82 are adhered to the first and second pressure port members 12, 13, and located between the first and second pressure port members 12, 13 and the case 10. As such, the first and second pressure detection chambers 11a, 11b filled with the oil 70 are sealed.

For example, the first pressure port member 12 permits an entry of an upstream pressure of the DPF through an inlet port 12a. The second pressure port member 13 permits an entry of a downstream pressure of the DPF through an inlet port 13a. The pressures entering from the inlet ports 12a, 13a are transmitted to the first and second diaphragms 81, 82.

Further, the pressures applied to the first and second diaphragms 81, 82 are transmitted to the sensing portion 20 through the oil 70. The sensing portion 20 detects a pressure based on a differential pressure of the oil 70 between the first and second pressure detection chambers 81, 82.

The above pressure sensor is for example produced in a following manner. First, the case 10 is formed. In the case 10, terminals 10a and nuts 61 are embedded such as by insert-molding. Next, the sensing portion 20 integrated with a seating 30 is adhered to the first recessed portion 11a. The sensing portion 20 is wired to the terminals 10a through bonding wires 40.

Then, the O-rings 90 are placed on the case 10. This case 10 and the first pressure port member 12 to which the first diaphragm 81 has been adhered are housed in a vacuum chamber. In the vacuum, the oil 70 is injected in the first recessed portion 11a.

Then, the first pressure port member 12 is joined to the first side of the case 10 in the vacuum so that the first diaphragm 81 covers the first recessed portion 11a in which the oil 70 has been injected. The above assembling process is performed in the vacuum to avoid entry of air into the first pressure detection chamber 11a.

The connected case 10 and the first pressure port member 12 are removed from the vacuum chamber into the atmosphere. The case 10 and the first pressure port member 12 are fixed by fastening the screws 60 with the nuts 61, thereby to seal the first pressure detection chamber 11a. The second pressure port member 13 is connected to the case 10 in the similar manner.

In the above pressure sensor, the first and second pressure port members 12, 13 to which the diaphragms 81, 82 have been integrated are fixed to the case 10 after the oil 70 is injected separately into the first and second recessed portion 11a, 11b. Therefore, it is necessary to fix the first and second pressure port members 12, 13 in the vacuum. As such, it is likely to take time and effort to inject the oil 70 and fix the diaphragms 81, 82 to the case 10.

Also, the oil 70 is injected to each of the pressure detection chambers 11a, 11b, and the diaphragms 81, 82 are fixed to respective sides of the case 10 after the oil injection. Therefore, the amount of oil 70 is likely to be uneven between the two chambers 11a, 11b. Also, forces applied to the oil 70 by the first and second diaphragms 81, 82 are likely to be uneven between the two chambers 11a, 11b. As a result, oil inside pressure is likely to be uneven between the two chambers 11a, 11b.

SUMMARY OF THE INVENTION

The present invention is made in view of the foregoing matter, and it is an object to provide a pressure sensor having two chambers filled with a pressure medium, capable of reducing a difference of pressure of the pressure medium between the two chambers.

According to an aspect of the present invention, a pressure sensor has a case, a sensing portion, a first diaphragm, a second diaphragm and a sealing part. The case has a first side and a second side. The first diaphragm is mounted to the first side of the case such that a first chamber is defined. The second diaphragm is mounted to the second side of the case such that a second chamber is defined. The first chamber and the second chamber are filled with a pressure medium. The case forms an introduction passage extending to the first chamber and the second chamber for introducing the pressure medium into the first chamber and the second chamber. The sealing part is disposed to seal the introduction passage such that the first chamber and the second chamber are separated from each other and from an outside of the case.

In the pressure sensor, the pressure medium is simultaneously injected in the first chamber and the second chamber through the introduction passage, after the first diaphragm and the second diaphragm are fixed to the case. Further, the introduction passage is sealed by the sealing part.

Accordingly, it is possible to fix the first diaphragm and the second diaphragm in the atmosphere. Also, since the pressure medium can be simultaneously injected into two chambers through the introduction passage, the number of assembling steps is reduced. Further, the pressure medium is equally filled in the two chambers.

BRIEF DESCRIPTION OF THE DRAWINGS

Other objects, features and advantages of the present invention will become more apparent from the following detailed description made with reference to the accompanying drawings, in which like or equivalent parts are designated by like reference numbers and in which.

DETAILED DESCRIPTION OF EXAMPLE EMBODIMENT

First Example Embodiment

A first example embodiment of the present invention will now be described with reference to FIGS. 1 to 4B. A pressure sensor S1 is an oil-filled type differential pressure sensor. The pressure sensor S1 is for example used for detecting a pressure loss by the DPF provided in an exhaust pipe of an automobile with a diesel engine. The pressure sensor S1 is fixed to the exhaust pipe and detects a differential pressure (relative pressure) between an upstream position and a downstream position of the DPF in the exhaust pipe. However, the use of the pressure sensor S1 is not limited to the above.

Figure 1:
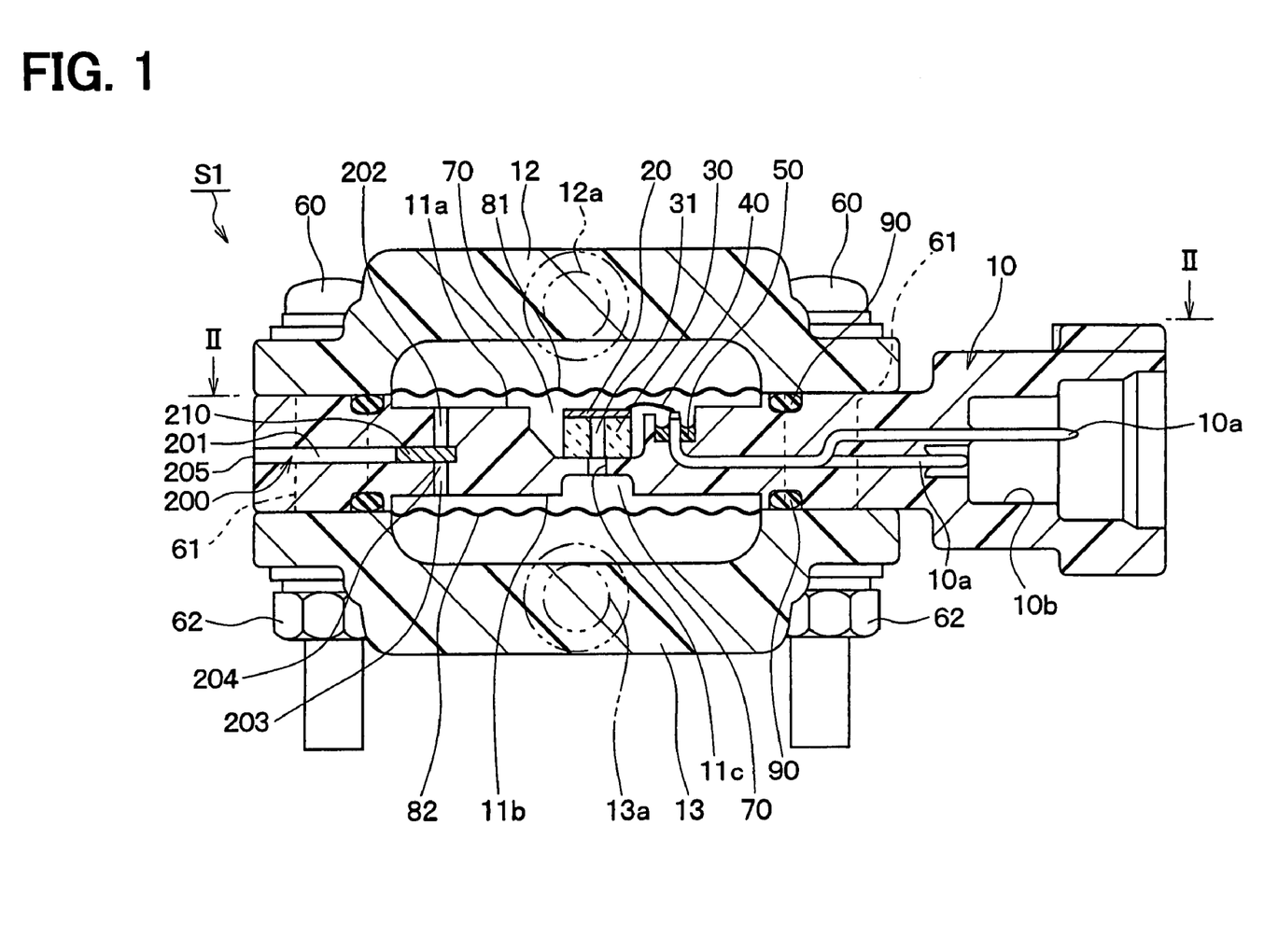
FIG. 1 is a cross-sectional view of a pressure sensor according to a first example embodiment of the present invention.

As shown in FIG. 1, a case 10 makes a main body of the pressure sensor S1. The case 10 is for example made of a resin such as polybutylene terphthalate (PBT) and polyphenylene sulfide (PPS).

The case 10 has a first recessed portion on its first side (upper side in FIG. 1) for defining a first pressure detection chamber 11a with a first diaphragm 81 and a second recessed portion on its second side (lower side in FIG. 1) for defining a second pressure detection chamber 11b with a second diaphragm 82. The case 10 forms a through hole 11a passing from the first pressure detection chamber (hereafter, first chamber) 11a to the second pressure detection chamber (hereafter, second chamber) 11b.

Each of the first recessed portion and the second recessed portion forms two-stepwise recessions so that its middle portion is more recessed from the other portion. The through hole 11a is formed at the middle of the first and second recessed portions. A sensing element 20 for detecting a pressure is mounted on the case 10 such that that the through hole 11c is covered.

The sensing element 20 serves as a sensing portion that outputs an electric signal in response to an applied pressure. Specifically, the sensor element 20 generates an electric signal according to the degree of the applied pressure.

The sensor element 20 is for example constructed of a diaphragm-type semiconductor sensor chip that includes a silicon semiconductor substrate having a thin part as a diaphragm although the diaphragm is not shown in FIG. 1.

In the diaphragm-type semiconductor sensor chip, a bridge circuit, which is constructed of a diaphragm and a diffused resistor element, is formed in a silicone semiconductor chip by semiconductor processing. When the diaphragm of the sensor chip is deformed by pressure, a change of a resistance caused by the pressure is converted into the electric signal and outputted.

The sensor element 20 is integrated with a seating 30. The seating 30 is for example made of glass. The sensor element 20 and the seating 30 are for example joined by anodic bonding.

The sensor element 20 is mounted to a bottom of the middle portion of the first chamber 1a through the seating 30. The seating 30 is for example adhered to the case 10 with an adhesive material (not shown) such as a silicone adhesive. As such, the sensor element 20 and the seating 30 are fixed to the case 10. The seating 30 is formed with a through hole 31 that communicates with the second chamber 11b through the hole 11c of the case 10.

Namely, the second chamber 11b communicates with the through hole 31 of the seating 30 through the hole 11c of the case 10. An end of the through hole 31 is closed with the sensor element 20. Accordingly, the first chamber 11a and the second chamber 11b are separated from each other by the sensor element 20.

In the case 10, terminals 10a are inserted as wiring members for transmitting the electric signals outputted from the sensor element 20. The terminals 10a are for example made of conductive metal such as brass. Each of the terminals 10a has a stick shape. The terminal 10a is fixed in the case 10 such as by insert-molding.

A first end of the terminal 10a is exposed to the first chamber 11a at a position adjacent to the sensor element 20. The first end of the terminal 10a is electrically connected to the sensor element 20 through a wire 40. The wire 40 is for example made of aluminum or gold. The wire 40 is for example made by a general wire-bonding method.

A sealing member 50 is provided around the first end of the terminal 10a, which is exposed to the first chamber 11a, for sealing a gap between the terminal 10a and the case 10. The sealing member 50 is for example made of resin such as a silicone resin or an epoxy resin.

The terminal 10a is fixed in the case 10 such that its main portion generally extends in a direction parallel to the bottom of the first chamber 11a. A second end of the terminal 10a, which is opposite to the first end, is exposed to an outside of the case 10 from an opening portion 10b of the case 10.

The second end of the terminal 10a and the opening portion 10b are connectable to an external connecting member (not shown). As such, the sensor element 20 can transmit and receive the signals to and from an external circuit (e.g., an ECU of a vehicle) through the wire 40 and the terminal 10a.

Namely, the opening portion 10b and the second end of the terminal 10a form a connector part to be connected to an external device. The case 10 serves as a member for holding the sensing element 20 and as a connector case.

Further, a first pressure port member 12 and a second pressure port member 13 for introducing pressure from the outside are fixed to the case 10, as shown in FIG. 1. The first pressure port member 12 is fixed to the first side of the case 10. The second pressure port member 13 is fixed to the second side of the case 10.

The first and second pressure port members 12, 13 are for example made of resin such as PBT or PPS, similar to the case 10. The first pressure port member 12 is formed with an inlet port 12a, as shown by chain double-dashed line in FIG. 1. Likewise, the second pressure port member 13 is formed with an inlet port 13a.

The first and second pressure port members 12, 13 are integrated with the case 10 by using fastening members such as screws 60 and nuts 61, 62. The nuts 61 are inserted in the case 10 when the case 10 is molded. After the screws 60 are fastened with the nuts 61 in a condition that the first and second pressure port members 12, 13 are placed on the case 10, the nuts 62 are fastened with the screws 60. The fastening members are not limited to the screws 60 and the nuts 61, 62. Instead of the screws 60 and the nuts 61, 62, rivets, bolts and the like can be used to fix the first and second pressure port members 12, 13 to the case 10.

The first chamber 11a and the second chamber 11b are filled with a pressure medium. For example, oil 70 such as a fluorine oil or a silicone oil is used as the pressure medium.

The first diaphragm 81 is fixed between the first pressure port member 12 and the case 10. The second diaphragm 82 is fixed between the second pressure port member 13 and the case 10.

The first and second diaphragms 81, 82 are both metal diaphragms made of a material having corrosion resistance and heat resistance, such as Cr and Ni. For example, the material has a pitting index, which is defined by the equation (Cr+3.3 Mo+20N), of 50 or greater and contains Ni content of 30 weight % or greater.

As shown in FIG. 1, the first diaphragm 81 covers the first recessed portion so that the first chamber 11a is defined. Namely, the first diaphragm 81 seals the first chamber 11a filled with the oil 70. Likewise, the second diaphragm 82 covers the second recessed portion so that the second chamber 11b is defied. Namely, the second diaphragm 82 seals the second chamber 11 filled with the oil 70.

Figure 2:
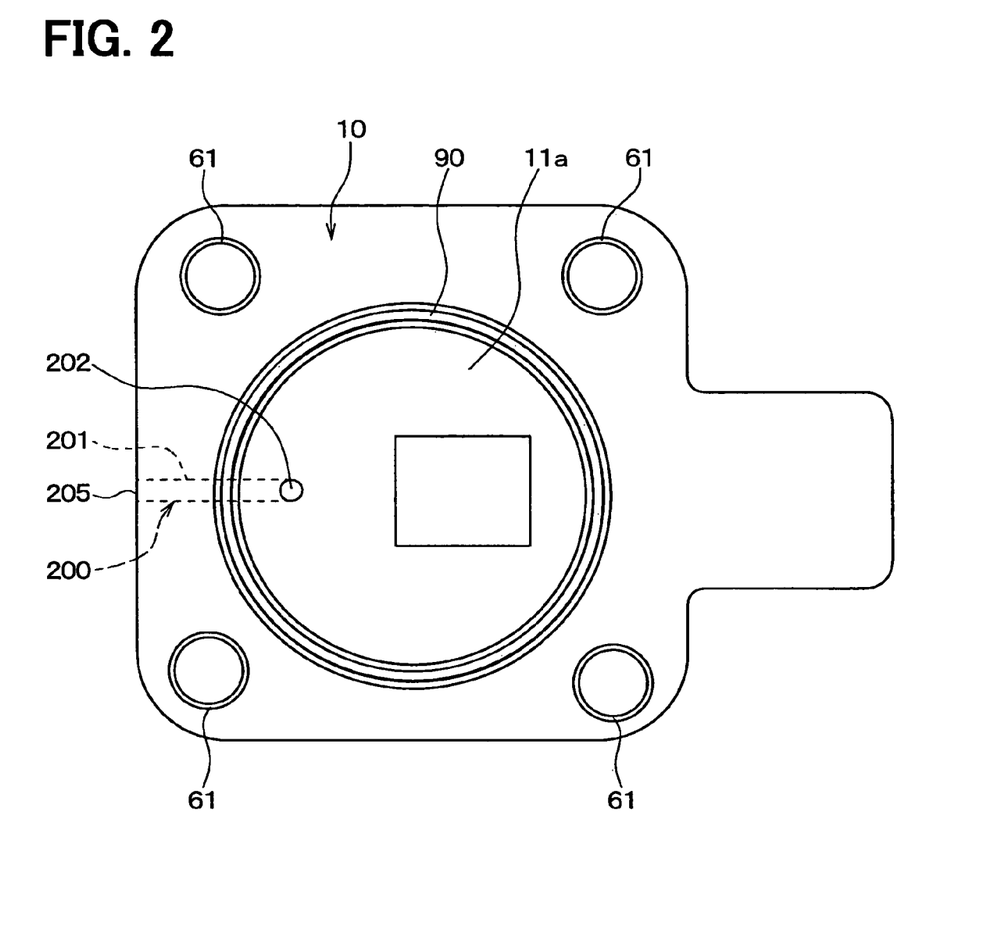
FIG. 2 is a plan view of a case of the pressure sensor when viewed in a direction parallel to arrows II in FIG. 1.

Further, O-rings 90 are disposed on the case 10 at positions where the first and second diaphragms 81, 82 are pressed against the case 10 so as to tightly seal the first and second chambers 11a, 11b. FIG. 2 shows the 0-ring 90 placed on the first side of the case 10. As shown in FIG. 2, the 0-ring 90 is arranged on the outer periphery of the first chamber 11a. The O-ring 90 is for example made of rubber.

Namely, as shown in FIG. 1, the first and second pressure port members 12, 13 are forced against the O-rings 90 through the diaphragms 81, 82, respectively. Accordingly, the first and second chambers 11a, 11b are tightly sealed by the diaphragms 81, 82 and the O-rings 90.

Although not illustrated in FIG. 1, peripheral portions 81a, 82a (shown in FIG. 3) of the first and second diaphragms 81, 82 are sandwiched between peripheral portions of the first and second pressure port members 12, 13 and outer peripheral portions of the recessed parts of the case 10 through the O-rings 90.

Also, the first and second diaphragms 81, 82 are adhered to the first and second pressure port members 12, 13 with an adhesive material made of a resin such as a fluorosilicone resin or a fluoride resin, respectively. The adhesive material is denoted by numeral 100 in FIG. 3.

Accordingly, the first chamber 81a filled with the oil 70 is formed on the first side of the case 10 with the first diaphragm 81, and the second chamber 82a filled with the oil 70 is formed on the second side of the case 10 with the second diaphragm 82.

In the pressure sensor S1, the pressure of the oil 70 in the first chamber 11a and the pressure of the oil 70 in the second chamber 11a are applied to the sensor element 20. The pressure sensor S1 detects a pressure based on a differential pressure between the pressures applied to the sensor element 20.

Figure 3:
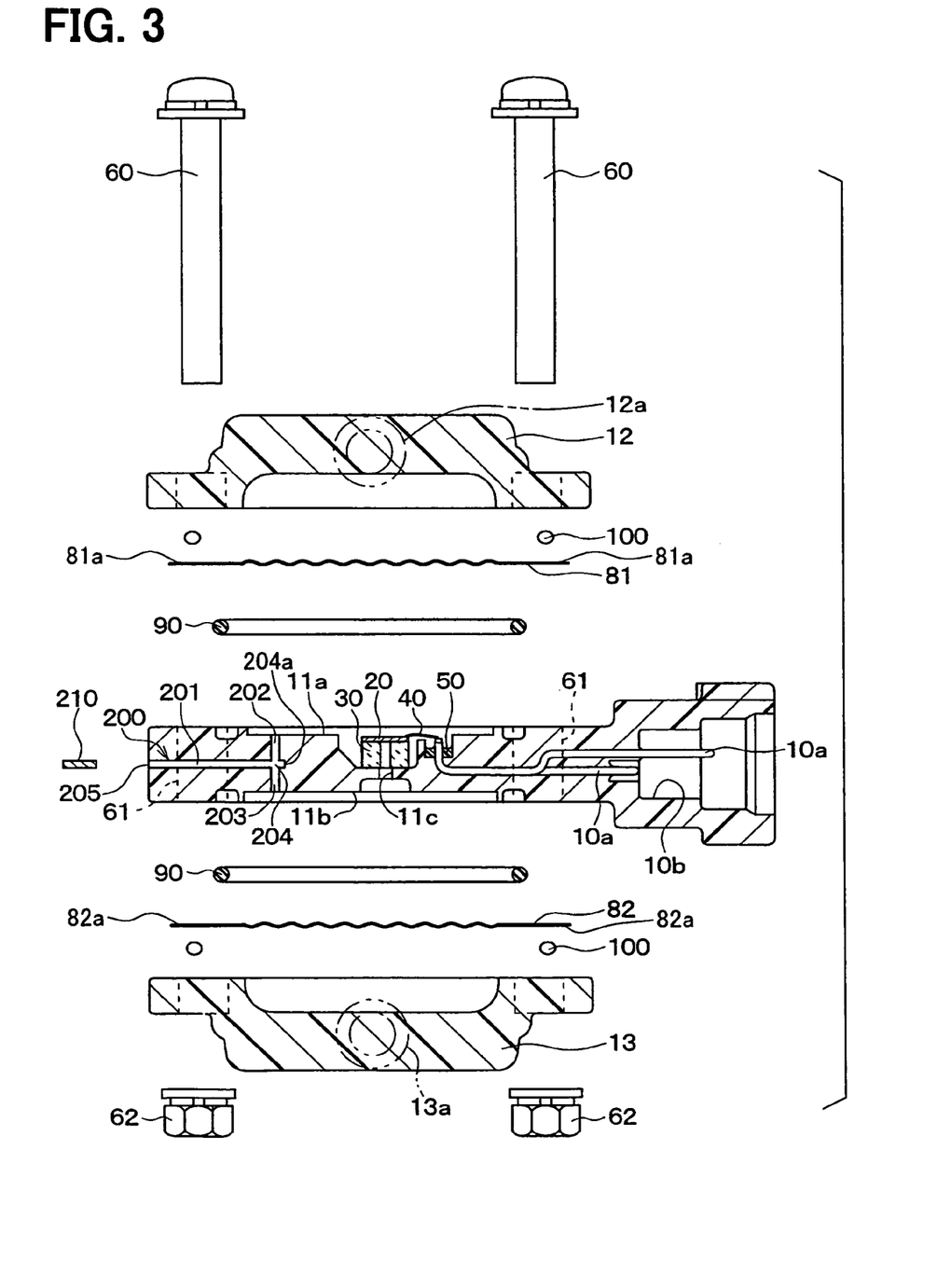
FIG. 3 is an exploded view of the pressure sensor except for an oil according to the first example embodiment.

Furthermore, as shown in FIGS. 1 to 3, the case 10 has an oil introduction passage 200 through which the oil 70 is introduced into the first chamber 11a and the second chamber 11b. The first chamber 11a and the second chamber 11b can communicate with each other and with an outside of the case 10 through the oil introduction passage 200.

For example, the oil introduction passage 200 has a main passage 201 and a branch part 204. The main passage 201 extends from an opening 205 formed in a side wall of the case 10 toward the inside of the case 10. The branch part 204 is formed at an inner end of the main passage 201. The branch part 204 includes a first branch passage 202 and a second branch passages 203 both diverging from the main passage 201.

The first branch passage 202 extends to the first chamber 11a and the second branch passage 203 extends to the second chamber 11b. Namely, the main passage 201 communicates with the first and second chambers 11a, 11b through the first and second branch passages 202, 203, respectively. Also, the first chamber 11a and the second chamber 11b communicate with each other through the branch part 204. Namely, the branch part 204 is constructed as a communication part for allowing communication between the first chamber 11a, the second chamber 11b, and the outside of the case 10.

As shown in FIGS. 1 and 3, the first branch passage 202 extends to the first side of the case 10 and the second branch passage 203 extends to the second side of the case 10. Thus, the branch part 204 forms substantially a T-shaped passage.

Further, in a condition that the first and second chambers 11a, 11b are filled with the oil 70, the branch part 204 is sealed with a sealing member 210. For example, the sealing member 210 is a cap member.

The cap member 210 is inserted into the branch part 204 from the opening 205. When the cap member 210 is received in the branch part 204, the first chamber 11a and the second chamber 11b are separated from each other and from the outside of the case 10.

For example, the cap member 210 has a stick shape and is made of a resin or a metal. Here, the branch part 204 forms a recess 204a. The recess 204a is formed more inside of the case 10 than the first and second branch passages 202, 203 with respect to an axis of the main passage 201. The recess 204a forms an inner end of the oil introduction passage 200. The cap member 210 is inserted such that its end is received in the recess 204a.

Thus, the cap member 210 serves as a sealing member for completely separating the first chamber 11a and the second chamber 11b as well as for completely closing the branch part 204. Namely, the cap member 210 restricts the communication between the first chamber 11a and the second chamber 11b through the oil injection passage 200. Also, the cap member 210 restricts leakage of the oil 70 to the outside of the case 10. In other words, the first and second chambers 11a, 11b are sealed by the first and second diaphragms 81, 82 and the cap member 210.

For example, the cap member 210 has a sectional area larger than a passage area of the oil introduction passage 200, in a cross sectional plane defined perpendicular to the axis of the main passage 201. Thus, the cap member 210 can be press-fitted in the oil introduction passage 200. As such, the branch part 204 is firmly sealed.

The sealing of the branch part 204 is not limited to the above. Instead of press-fitting, the cap member 210 can be fixed by another method such as welding, adhesion, and/or screwing.

For example, the cap member 210 can be welded by ultrasonic welding. In this case, the cap member 210 is made of resin. After the cap member 210 is inserted into the oil introduction passage 200, an ultrasonic vibrator is inserted from the opening 205. By applying ultrasonic vibrations, the cap member 210 and the case 10 are welded.

Alternatively, the cap member 210 can be adhered within the oil introduction passage 200 by using an adhesive material. Further, the cap member 210 can be fastened with the case 10. In this case, male screw is formed on the cap member 210. Female screw is formed in the main passage 201 of the oil introduction passage 200. The cap member 210 can be screwed into the case 10.

Next, operation of the pressure sensor S1 will be described. Although not illustrated, the inlet port 12a of the first pressure port member 12 is connected to an upstream position of the DPF through a rubber pipe and the like, and the inlet port 13a of the second pressure port member 13 is connected to a downstream position of the DPF through a rubber pipe, for example.

As such, an upstream pressure, which is upstream of the DPF, is introduced in the first pressure port member 12, and a downstream pressure, which is downstream of the DPF is introduced in the second pressure port member 13. The upstream pressure and the downstream pressure, which have been introduced in the first and second pressure port members 12, 13, are transmitted to the sensor element 20 through the first and second diaphragms 81, 82.

Specifically, the upstream pressure introduced in the first pressure port member 12 is applied to the first diaphragm 81. The downstream pressure introduced in the second pressure port member 13 is applied to the second diaphragm 82. The upstream and downstream pressures are further applied to the sensor element 20 from the first and second diaphragms 81, 82 through the oil 70. The sensor element 20 detects a difference between the pressures.

The sensor element 20 is constructed of the diaphragm-type semiconductor sensor chip. A first surface of the diaphragm (not shown) of the sensor element 20 receives pressure through the oil 70 of the first chamber 11a. The first surface of the diaphragm is located on a side of the first chamber 11a.

In the second chamber 11b, the oil 70 is filled also in the through hole 31 of the seating 30. Thus, a second surface of the diaphragm of the sensor element 20 receives pressure through the oil 70 of the second chamber 11b. The second surface of the sensor element 20 is opposite to the first surface and is located on a side of the second chamber 11b.

Accordingly, the upstream pressure of the DPF is transmitted to the first surface of the diaphragm of the sensor element 20 through the first diaphragm 81 and the oil 70. Also, the downstream pressure of the DPF is transmitted to the second surface of the diaphragm of the sensor element 20 through the second diaphragm 82 and the oil 70.

The diaphragm of the sensor element 20 is deformed by a differential pressure between the upstream pressure and the downstream pressure. Based on the deformation, the sensor element 20 outputs the signal to the external device through the wire 40 and the terminal 10a. As such, the pressure is detected.

Next, a method of manufacturing the pressure sensor S1 will be described. First, the case 10 having the first recessed portion, the second recessed portion and the oil introduction passage 200 is prepared. Also, the terminals 10a, the nuts 61 are held in the case 10 by insert-molding. The sealing member 50 is applied to the first end of the terminal 10a, which is exposed in the first recessed portion. As such, the first end of the terminal 10a is sealed with the case 10.

Then, the sensor element 20, which has been integrated with the seating 30, is bonded in the first recessed portion of the case 10. The sensor element 20 and the terminal 10a are wired through the wire 40 by wire-bonding.

Next, the first diaphragm 81 is adhered to the first pressure port member 12 with the adhesive material 100. The O-ring 90 is placed on the first side of the case 10. The first pressure port member 12 integrated with the first diaphragm 81 is arranged on the first side of the case 10 such that the first diaphragm 81 covers the first recessed portion through the O-ring 90. Further, the first pressure port member 12 and the case 10 are fixed by fastening the screws 60 with the nuts 61.

Likewise, the second diaphragm 82 is adhered to the second pressure port member 13 with the adhesive material 100. The O-ring 90 is placed on the second side of the case 10. The second pressure port member 13 integrated with the second diaphragm 82 is arranged on the second side of the case 10 such that the second diaphragm 82 covers the second recessed portion through the O-ring 90. Further, the second pressure port member 13 and the case 10 are fixed by fastening the nuts 62 with the screws 60.

As such, the first and second diaphragms 81, 82 are fixed to the case 10, and therefore the first and second chambers 11a, 11b are formed. In this condition, the cap member 210 is not inserted in the oil introduction passage 200, as shown in FIG. 3. Namely, the first chamber 11a and the second chamber 11b are communicated with each other and the outside of the case 10 through the oil introduction passage 200.

Then, the case 10 to which and the first and second pressure port members 12, 13 have been fixed as described above is placed in the vacuum, such as in a vacuum chamber. The oil 70 is injected into the first and second chambers 11a, 11b through the oil introduction passage 200 in the vacuum.

For example, a nozzle (not shown) for injecting the oil 70 is inserted in the oil introduction passage 200 from the opening 205. The oil 70 is injected into the oil introduction passage 200 from the nozzle. Thus, the oil 70 flows to the branch part 204 through the main passage 201, and then separates into the first and second branch passages 202, 203. As such, the oil 70 is simultaneously introduced into the first chamber 11a and the second chamber 11b.

After the first and second chambers 11a, 11b and the oil introduction passages 200 are filled with the oil 70, the assembled case 10 is removed from the vacuum chamber to the atmosphere. The cap member 210 is inserted from the opening 205 and press-fitted in the oil introduction passage 200. Accordingly, the oil introduction passage 200 is sealed. At this time, the cap member 210 is for example pressed into the oil introduction passage 200 by using a metal rod and the like. Then, characteristic adjustment and tests are performed. Accordingly, the pressure sensor S1 shown in FIG. 1 is produced.

Next, advantageous effect of the pressure sensor S1 will be described. In the pressure sensor S1, the case 10 is formed with the oil introduction passage 200. The oil introduction passage 200 permits the communications between the first chamber 11a, the second chamber 11b, and the outside of the case 10 in the condition that the sealing member 210 is not inserted. Also, the oil introduction passage 200 permits the oil 70 to enter the first and second chambers 11a, 11b.

Further, the pressure sensor S1 has the cap member 210 as the sealing member. The cap member 210 seals the branch part 204 in the condition that the first and second chambers 11a, 11b are filled with the oil 70. Furthermore, the first chamber 11a and the second chamber 11b are separated from each other by the cap member 210. Also, the first chamber 11a and the second chamber 11b are separated from the outside of the case 10 by the cap member 210.

In the conventional pressure sensor, the diaphragms are fixed after the oil is injected into the first and second recessed portions of the case separately. On the contrary, in the pressure sensor S1 of the first example embodiment, the oil 70 can be simultaneously introduced in the first and second chambers 11a, 11b after the diaphragms 81, 82 are fixed to the case 10 in the atmosphere. Namely, the oil 70 can be injected at a time.

In the conventional pressure sensor, the diaphragms are fixed after the injection of the oil. Therefore, it is necessary to fix the diaphragms in the vacuum to avoid air from entering the pressure detection chambers. On the contrary, in the example embodiment, the diaphragms 81, 82 can be fixed in the atmosphere before filling the oil 70. Thus, it is easy to fix the diaphragms 81, 82, as compared to the conventional pressure sensor.

Also, in the conventional pressure sensor, the oil is injected separately to each of the pressure detection chambers, and then the diaphragms are fixed to each of the chambers. Therefore, the amount of oil is likely to be uneven between two chambers. Also, compression force to the oil by each diaphragms is likely to be uneven. As a result, the oil pressures in the two chambers are uneven.

On the contrary, in the pressure sensor S1, the oil 70 is simultaneously injected in the two chambers 11a, 11b through the oil introduction passage 200, after the first and second diaphragms 81, 82 are fixed. Thus, the oil pressures of the two chambers 11a, 11b are substantially equal.

Accordingly, the oil 70 is easily injected and the diaphragms 81, 82 are easily fixed, as compared with the conventional pressure sensor. Also, a difference of the oil pressures between two chambers 11a, 11b is reduced.

In the first example embodiment shown in FIGS. 1 to 3, the length of the cap member 210 is shorter than a distance between the opening 205 and the recess 204a of the oil introduction passage 200. However, the cap member 210 of the first example embodiment will be modified as shown in FIG. 4B.

Figure 4A:
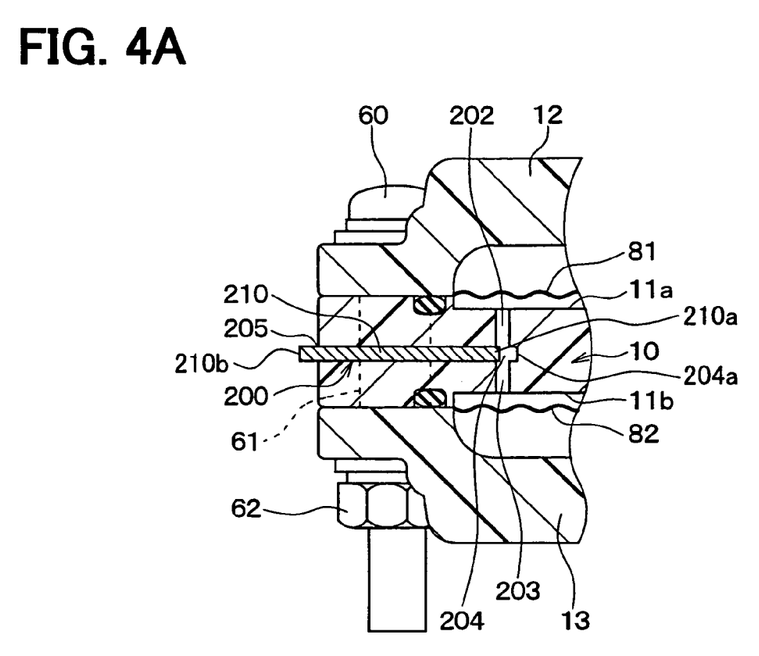
FIG. 4A is a cross-sectional view of the pressure sensor for showing a condition in which a cap member is not completely inserted in an oil introduction passage according to a modification of the first example embodiment.
Figure 4B:
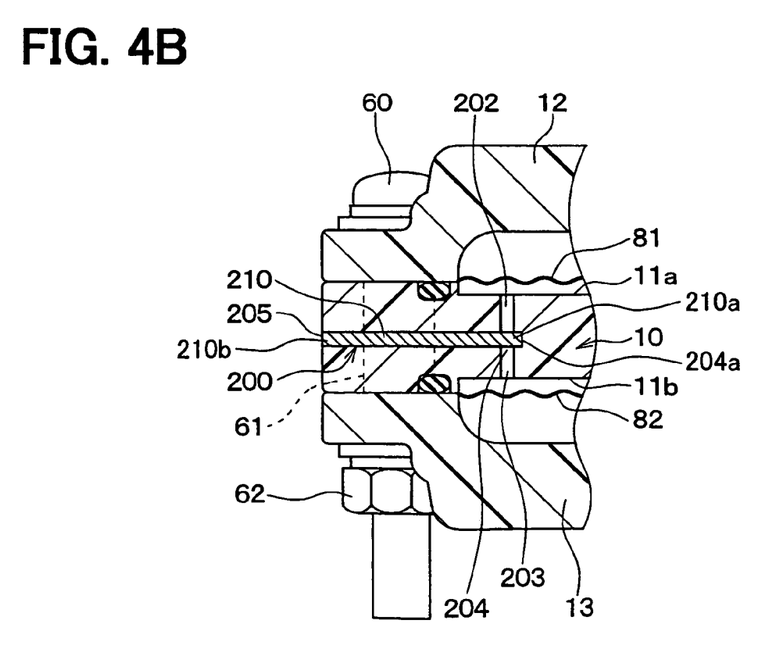
FIG. 4B is a cross-sectional view of the pressure sensor for showing a condition in which the cap member is completely inserted in the oil introduction passage according to the modification of the first example embodiment.

In the modified embodiment shown in FIG. 4B, the cap member 210 has a length equal to the distance between the opening 205 and the recess 204a of the oil introduction passage 200. Therefore, when the cap member 210 is fully inserted in the oil introduction passage 200 such that a first end 210a of the cap member 210 contacts an inner wall of the recess 204a of the branch part 204, a second end 210b of the cap member 210 coincides with the opening 205 on the side wall of the case 10, as shown in FIG. 4B. That is, the second end 210b of the cap member 210 does not project from the side wall of the case 10 and is not recessed from the side wall of the case 10.

If the cap member 210 is not fully inserted in the main passage 201, as shown in FIG. 4A, the first end 210a of the cap member 210 does not reach the branch part 204. Because a gap is formed between the first end 210a and the recess 204a, the branch part 204 is not completely sealed.

In this condition, the second end 210b of the cap member 210 projects from the opening 205, as shown in FIG. 4A. Therefore, it is easy to check whether the cap member 210 is fully inserted in the oil introduction passage 200. When the insertion of the cap member 210 is not sufficient, the cap member 210 can be further inserted such that the second end 210b becomes on the same level as the wall of the case 10. Thus, the first end 210a is received in the recess 204a of the branch part 204. Accordingly, the cap member 210 is fully inserted, thereby completely sealing the branch part 204.

Second Embodiment

Figure 5:
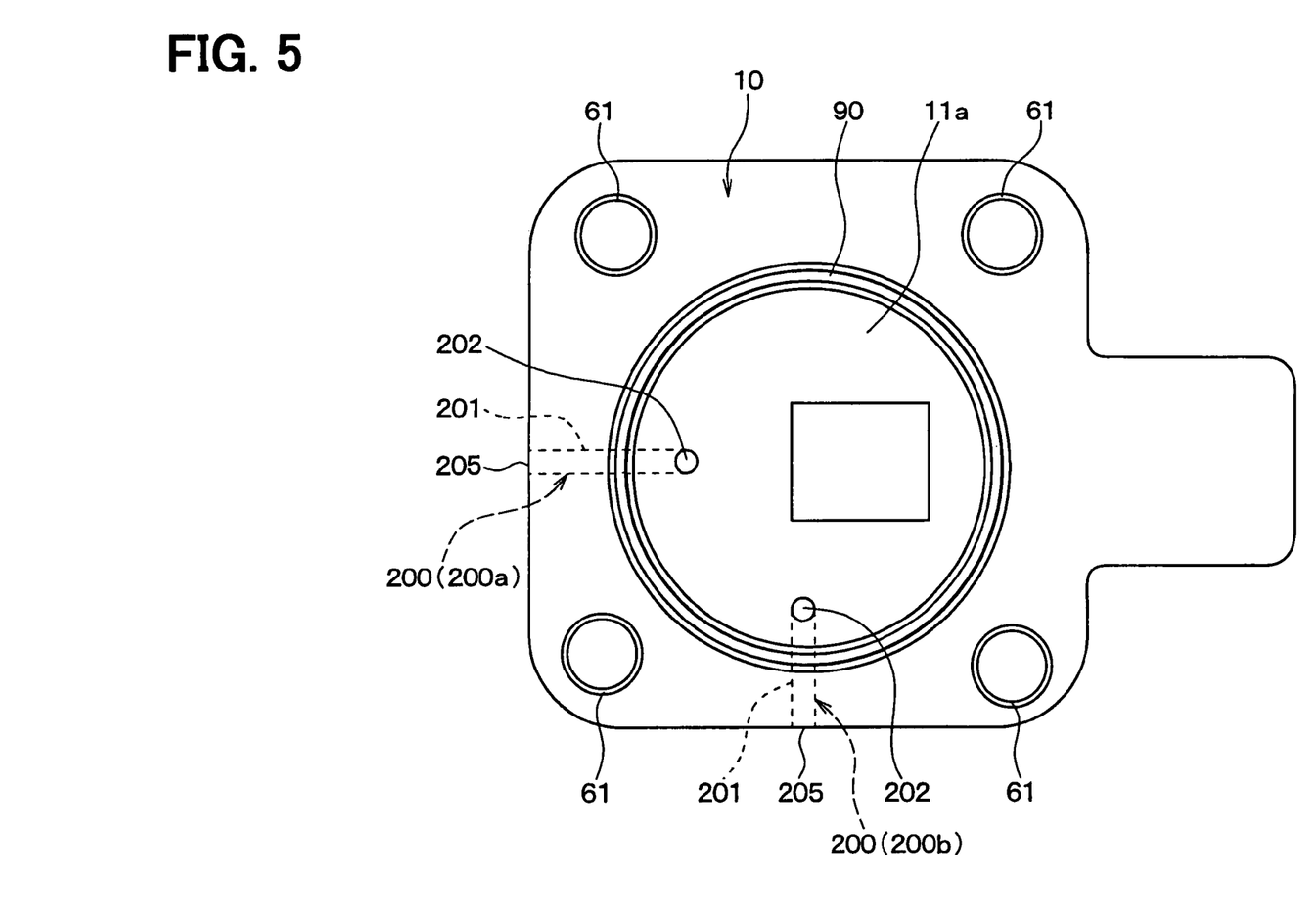
FIG. 5 is a plan view of a case of a pressure sensor according to a second example embodiment of the present invention.

Next, a second example embodiment will be described with reference to FIG. 5. As shown in FIG. 5, the pressure sensor S1 has two oil introduction passages 200 (200a, 20b). Each of the oil introduction passage 200a, 200b has a structure similar to that of the oil introduction passage 200 of the first example embodiment. Each oil introduction passage 200a, 200b is provided with the cap member 210, similar to the first example embodiment and the modification of the first example embodiment.

In the second example embodiment, the pressure sensor S1 has a structure similar to that of the first example embodiment except having two oil introduction passages 200a, 200b. The pressure sensor S1 of the second example embodiment provides advantageous effect similar to those of the first example embodiment. Here, like components are denoted by like reference characters and a description thereof is not repeated.

In the second example embodiment, the oil 70 is injected into the first and second chambers 11a, 11b through the first oil introduction passage 200a. At this time, extra oil 70, which is over the volume of the first and second chambers 11a, 11b, can overflow through the second oil introduction passage 200b.

For example, nozzles (not shown) are connected to the first and second oil introduction passages 200a, 200b, respectively. The oil 70 is injected into the first oil introduction passage 200a by using pump (not shown) or the like such that the oil 70 flows in the first and second chambers 11a, 11b through the first oil introduction passage 200a and further flows in the second oil introduction passages 200b from the first and second chambers 11a, 11b.

As such, the oil 70 can be injected to the first and second chambers 11a, 11b at the same time, similar to the first example embodiment. Further, the oil 70, which overflows from the first and second chambers 11a, 11b, can be discharged through the second oil introduction passage 200b.

Therefore, the first and second chambers 11a, 11b can be fully filled with the oil 70. Even if the oil 70 is injected in the atmosphere, it is less likely that air will be mixed in the first and second chambers 11a, 11b. Thus, it is easy to inject the oil 70.

Third Embodiment

Figure 6:
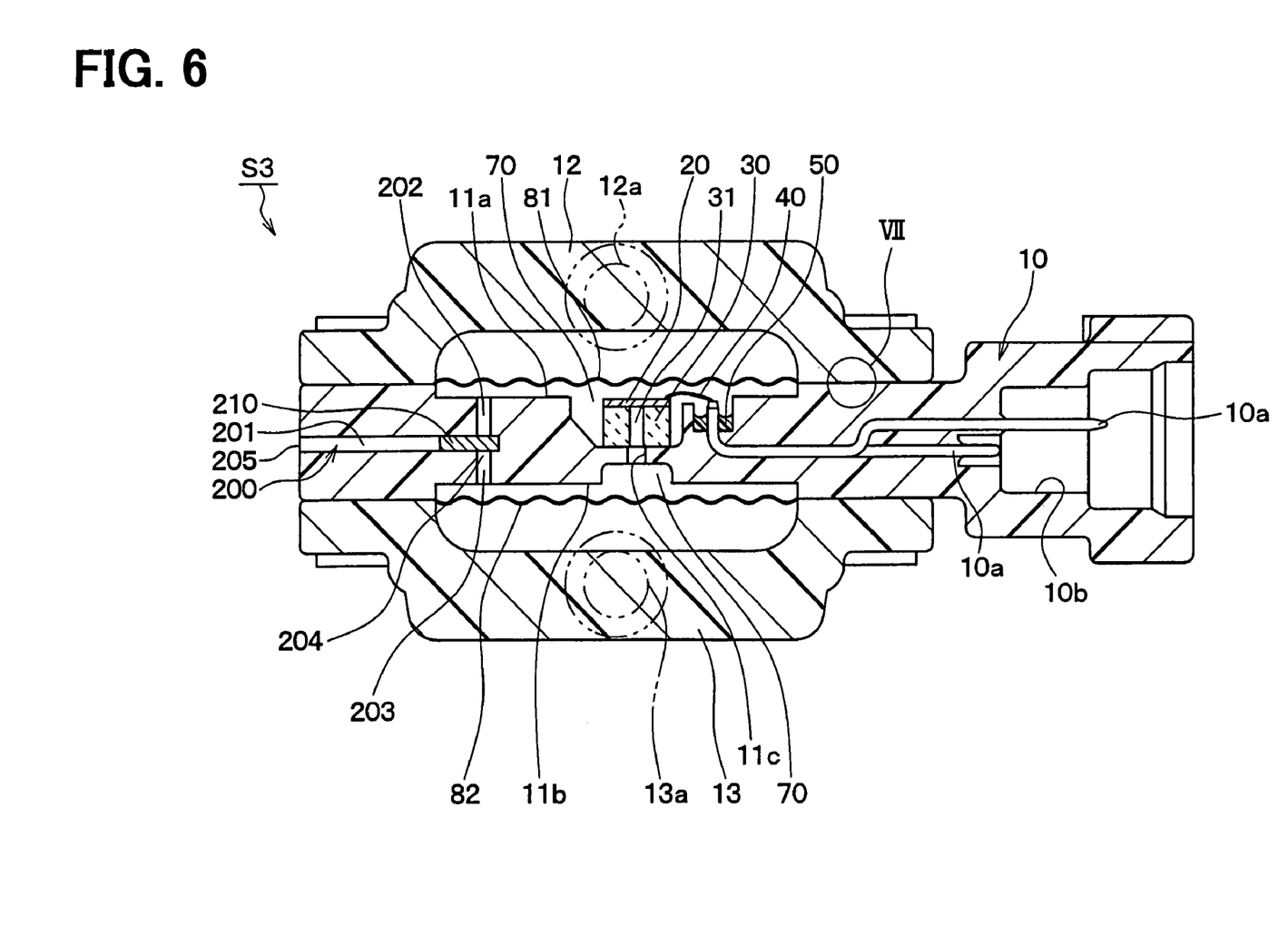
FIG. 6 is a cross-sectional view of a pressure sensor according to a third example embodiment of the present invention.
Figure 7:
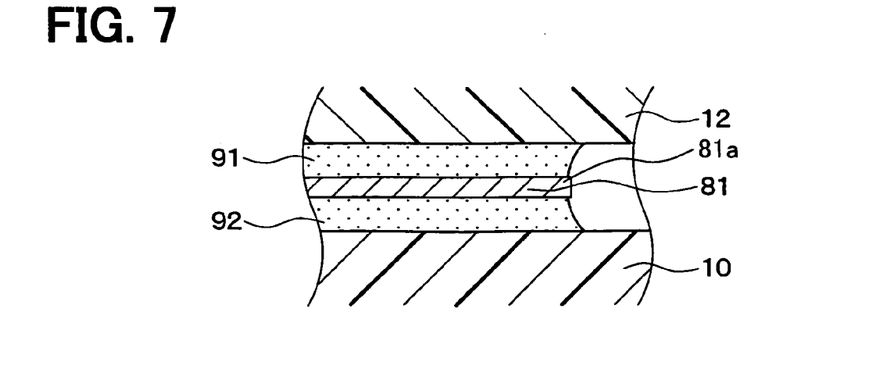
FIG. 7 is an enlarged cross-sectional view of a part of the pressure sensor denoted by a circle VII in FIG. 6.

Next, a third example embodiment will be described with reference to FIGS. 6 and 7. As shown in FIGS. 6 and 7, a pressure sensor S3 of the second example embodiment has a structure similar to that of the first and second example embodiment except the fastening means such as screws 60 and nuts 61, 62 and the O-rings 90. In the sensor S3, the case 10 and the first and second pressure port members 12, 13 are connected by different means. Here, like components are denoted by like reference characters and a description thereof is not repeated.

As shown in FIG. 6, the case 10 has the oil introduction passage 200 and the sealing member 210, similar to the first example embodiment. Thus, the pressure sensor S3 provides advantageous effects similar to those of the pressure sensor S1 of the first example embodiment. Further, the pressure sensor S3 can have plural oil introduction passages 200a, 200b, similar to the second example embodiment.

Also in the pressure sensor S3, the oil 70 can be injected into the first and second chambers 11a, 11b at the same time, after the diaphragms 81, 82 are fixed to the case 10. Namely, the oil 70 can be injected after the first and second pressure port members 12, 13 are fixed to the case 10.

Therefore, the first and second pressure port members 12, 13 are fixed to the case 10 by bonding, instead of fixing by the fastening means 60 to 62.

As shown in FIG. 7, the peripheral portion 81a of the first diaphragm 81, which is sandwiched between the first pressure port member 12 and the case 10, is adhered with an adhesive material. For example, a first adhesive material 91 is interposed between the first pressure port member 12 and the first diaphragm 81. A second adhesive material 92 is interposed between the first diaphragm 81 and the case 10. The second pressure port member 13 and the second diaphragm 82 are adhered to the case 10 in the similar manner.

The first adhesive material 91, which is located adjacent to the first and second pressure ports 12, 13, is made of a material having resistance against exhaust gas. For example, the first adhesive material 91 is made of a fluorosilicone resin or a fluorine resin. The second adhesive material 92, which is located adjacent to the case 10, is made of a material having resistance to swelling property against the oil 70. For example, when the oil 70 is a fluoride oil, the second adhesive material 92 is made of a silicone resin.

For example, the first diaphragm 81 is adhered to the first pressure port 12 with the first adhesive material 91. Then, the first pressure port member 12 on which the first diaphragm 81 has been bonded is bonded to the case 10 with the second adhesive material 92. The second pressure port member 13 and the second diaphragm 82 are bonded with the case 10, in the similar manner.

OTHER MODIFICATIONS

The shape of the oil introduction passages 200, 200a, 200b is not limited to the illustrated shape. Each of the oil introduction passages 200, 200a, 200b can have another shape as long as it allows communications among the first and second chambers 11a, 11b and the outside of the case 10 and the oil 70 to flow in the first and second chambers 11, 11b.

The sealing member is not limited to the cap member 210. For example, the oil introduction passages 200, 200a, 200b can be sealed by laser welding. In this case, a laser beam is emitted toward the branch part 204 from the opening 205 after the injection of the oil 70. Thus, the emitted portion of the case 10 is melted, thereby sealing the branch part 204. Alternatively, the oil introduction passages 200, 200a, 200b can be sealed by filling an adhesive agent.

The number of the oil introduction passages 200, 200a, 200b is not limited one or two. For example, the pressure sensor S1, S3 can have three or more oil introduction passages, in consideration of oil filling efficiency.

The mounting structure of the sensor element 20 to the case 10 is not limited to the above example embodiments. The sensor element 20 can be mounted in another way. Also, the electrical connection of the sensor element 20 and the arrangement of the terminals 10 are not limited to the above example embodiments.

In the sensor element 20, an integrated sensor chip in which circuits for processing the sensor signals are integrally formed by semiconductor processing can be employed as the sensor chip.

Further, the sensing portion is not limited to the diaphragm-type semiconductor sensor element 20. Another type of sensing element can be used as long as it can receive the differential pressure between the oils 70 of the first and second chambers 11a, 11b and output the signal based on the differential pressure.

In the above example embodiment, the pressure upstream of the DPF is introduced in the first chamber 11a through the first pressure port member 12 and the first diaphragm 81, and the pressure downstream of the DPF is introduced in the second chamber 11b through the second pressure port member 13 and the second diaphragm 82. Alternatively, the pressure upstream of the DPF can be introduced in the second chamber 11b through the second pressure port member 13 and the second diaphragm 82, and the pressure downstream of the DPF can be introduced in the first chamber 11a through the first pressure port member 12 and the first diaphragm 81.

The configuration of the first and second pressure port members 12, 13 is not limited to the illustrated embodiments. Namely, the pressure sensor S1, S3 described above is the oil-filled type differential pressure sensor in which a pressured is detected based on the differential pressure between the first and second chambers 11a, 11b. The pressure sensor S1, S3 has the oil introduction passage 200, 200a, 200b that permits communications between the first and second chambers 11a, 11b and the outside of the case 10. Also, the oil introduction passages 200, 200a, 200b are sealed by the sealing member 210 after the oil 70 is filled in the first and second chambers 11a, 11b so that the communications among the first and second chambers 11a, 11b and the outside of the case 10 are completely blocked. Structural parts other than the above feature parts can be appropriately modified.

The oil 70 is not limited to the fluoride oil and the silicone oil. Further, the pressure medium is not limited to the oil 70 as long as the pressures from the first and second diaphragms 81, 82 are properly transmitted to the sensor element 20.

The shape of the branch part 204 is not limited to the T-shape shown in FIG. 1. For example, it is not always necessary to the first branch passage 202 and the second branch passage 203 diverge from the main passage 201 at the same position with respect to the axis of the main passage 201. One of the first and second branch passage 202, 203 can diverge from the main passage 201 at a different position as the other one of the first and second branch passage 203. Also in this case, at least a portion between the first branch passage 202 and the second branch passage 203 is sealed by the sealing member 210 so that the communication between the first chamber 11a, the second chamber 11b and the outside of the case 10 are blocked.

The example embodiments of the present invention are described above. However, the present invention is not limited to the above example embodiments, but may be implemented in other ways without departing from the spirit of the invention.

What is claimed is:

1. A pressure sensor comprising:
    a case having a first side and a second side, wherein the case defines a first chamber filled with a pressure medium on the first side and a second chamber filled with the pressure medium on the second chamber, the case forms an introduction passage extending to the first chamber and the second chamber for introducing the pressure medium into the first chamber and the second chamber;
    a first diaphragm mounted to the first side of the case such that the first chamber is defined by the first side of the case and the first diaphragm; and
    a second diaphragm mounted to the second side of the case such that the second chamber is defined by the second side of the case and the second diaphragm;
    a sensing portion mounted to the case, wherein the sensing portion receives a first pressure from the pressure medium of the first chamber and a second pressure from the pressure medium of the second chamber and outputs a signal in response to a difference between the first pressure and the second pressure; and
    a sealing part disposed in the introduction passage such that the first chamber and the second chamber are separated from each other and from an outside of the case.

2. The pressure sensor according to claim 1, wherein the sealing part seals at least a part of the introduction passage, the part communicating with the first chamber, the second chamber and the outside of the case.

3. The pressure sensor according to claim 1, wherein
    the introduction passage defines an opening in an outer wall of the case, a main passage extending from the opening in an inside of the case and a branch part extending from the main passage,
    the branch part defines a first branch passage extending to the first chamber and a second branch passage extending to the second chamber, and
    the sealing part is disposed in the branch part.

4. The pressure sensor according to claim 3, wherein the sealing part is constructed of a cap member inserted from the opening.

5. The pressure sensor according to claim 4, wherein the cap member has a length equal to a distance between the opening of the introduction passage and the branch part.

6. The pressure sensor according to claim 4, wherein
    the branch part forms a recess at an end, the recess is located more inside of the case than the first branch passage and the second branch passage with respect to an axis of the main passage, and
    an end of the cap member is received in the recess.

7. The pressure sensor according to claim 4, wherein the cap member is press-fitted in the introduction passage.

8. The pressure sensor according to claim 1, wherein
    the case forms a plurality of introduction passages including the introduction passage, each of the introduction passages is sealed by the sealing part, and
    the at least one introduction passage is disposed to allow an extra amount of the pressure medium to overflow from the first chamber and the second chamber when the pressure medium is introduced in the first chamber and the second chamber through the at least one introduction passage.

9. The pressure sensor according to claim 1, wherein the pressure medium is an oil.

10. The pressure sensor according to claim 1, further comprising:
    a first pressure port member joined to the first side of the case, wherein the first pressure port member permits a first fluid to flow toward the first diaphragm so that a pressure of the first fluid is transmitted to the sensing portion through the pressure medium of the first chamber; and
    a second pressure port member joined to the second side of the case, wherein the second pressure port member permits a second fluid to flow toward the second diaphragm so that a pressure of the second fluid is transmitted to the sensing portion through the pressure medium of the second chamber.

11. The pressure sensor according to claim 10, wherein the first pressure port member and the second pressure port member are joined to the case by fastening means.

12. The pressure sensor according to claim 10, wherein
    the first diaphragm is partly interposed between the first pressure port member and the first side of the case,
    the second diaphragm is partly interposed between the second pressure port member and the second side of the case,
    the first pressure port member and the second pressure port member are adhered to the first diaphragm and the second diaphragm, respectively, with an adhesive material made of one of a fluorosilicone resin and a fluoride resin, and
    the case is adhered to the first diaphragm and the second diaphragm with an adhesive material made of a silicone resin.

* * * * *